United States Patent [19]

Yamazaki

[11] 4,179,731
[45] Dec. 18, 1979

[54] MICROPROGRAMMED CONTROL SYSTEM

[75] Inventor: Isamu Yamazaki, Yokohama, Japan

[73] Assignee: Tokyo Shibaura Electric Co., Ltd., Kawasaki, Japan

[21] Appl. No.: 784,459

[22] Filed: Apr. 4, 1977

[30] Foreign Application Priority Data

Apr. 2, 1976 [JP] Japan .................. 51-36073

[51] Int. Cl.² .................. G06F 9/16; G06F 9/20
[52] U.S. Cl. .................................. 364/200
[58] Field of Search .................. 364/200; 364/900

[56] References Cited
U.S. PATENT DOCUMENTS

| | | | |
|---|---|---|---|
| 3,644,900 | 2/1972 | Mizoguchi | 364/200 |
| 3,736,567 | 5/1973 | Lotan et al. | 364/200 |
| 3,764,988 | 10/1973 | Onishi | 364/200 |
| 3,775,756 | 11/1973 | Balser | 364/200 |
| 3,940,741 | 2/1976 | Horikoshi et al. | 364/200 |
| 3,956,738 | 5/1976 | Tessera | 364/200 |

Primary Examiner—Gareth D. Shaw
Assistant Examiner—Thomas M. Heckler
Attorney, Agent, or Firm—Oblon, Fisher, Spivak, McClelland & Maier

[57] ABSTRACT

A microprogrammed control system comprises: a memory for storing a microprogram programmed with microinstructions; a memory for storing microinstructions for branching microinstruction; an address register for storing the address of the microinstruction to be next executed; and a microinstruction register for storing the microinstruction to be executed. The program operation of the microprogrammed control system depends on whether the micro-instruction stored in the microinstruction register is the branching one or not. In the case of non-branching microinstruction, the operation of ordinary microinstructions is executed. In the case of branching microinstruction, a special operation is executed for making the operation of the branching microinstruction equivalent to that of the ordinary microinstruction.

6 Claims, 3 Drawing Figures

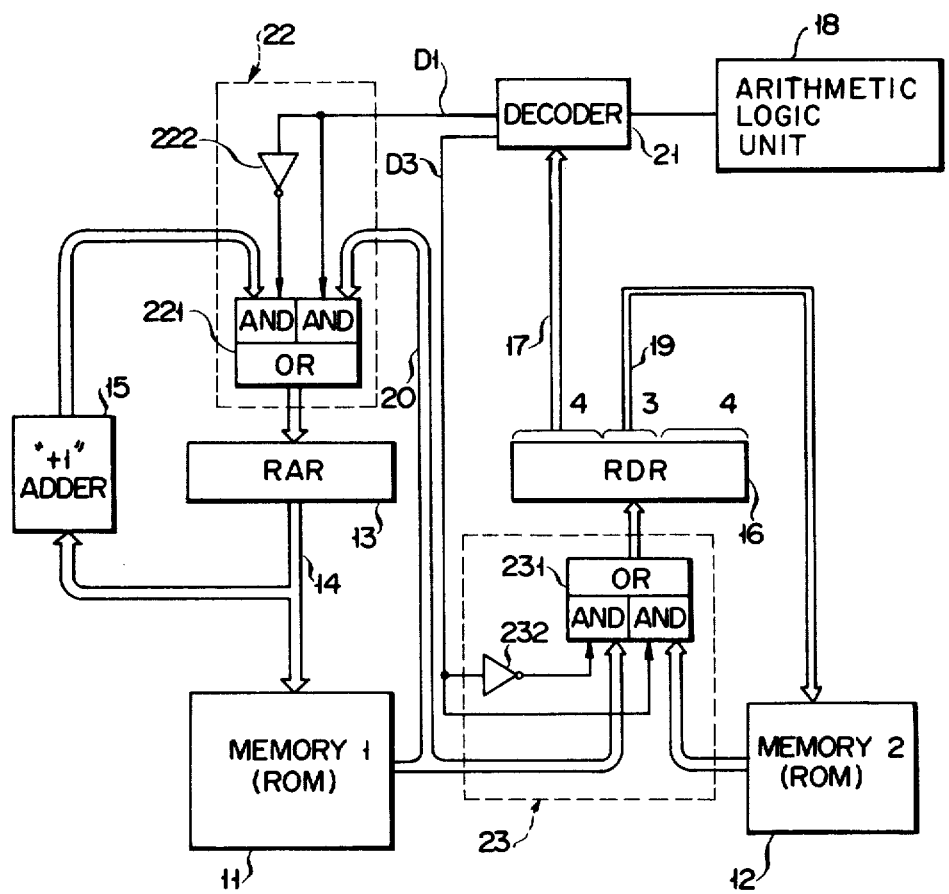
F I G. 3

MICROPROGRAMMED CONTROL SYSTEM

The present invention relates to a microprogrammed control system of computers and more particularly the one in which the operation of the branching microinstruction is improved and thus the efficiency of an entire computer system is improved.

In the microprogrammed control system, a known method is employed in which the instruction read-out operation for reading out a microinstruction for a microprogram memory and the instruction execution operation for executing the microinstruction read out from the microprogram memory are pipelined, i.e., both the operations are concurrently and parallelly processed in one machine cycle, thereby increasing the processing speed. In other words, as a microprogram is sequentially executed in the same order as a predetermined one of the addresses (usually the binary order of the address) of the microprogram memory, during the execution of an microinstruction, the contents of the address succeeding to that of the microinstruction is read out of the microprogram memory. For this, a register (RDR) for storing the microinstruction and another register (RAR) for storing the address for designating the microinstruction are provided and the contents of the address register RAR is always the address next to that for designating the instruction stored in the microinstruction register RDR and this address is delivered to the microprogram memory.

In this method, a new microinstruction must be loaded in the microinstruction register RDR at much the same as the address of the next instruction to be executed is loaded into the address register RAR. However, when the instruction loaded in the microinstruction register RDR is the branching microinstruction, the address of the instruction to be executed succeedingly is obtained only after the branching microinstruction is executed. In other words, two machine cycles, the instruction execution cycle and next instruction fetch cycle, are necessary for executing the branching microinstruction, with the result that the pipeline operation is interrupted and this disturbs the speeding-up of the program processing.

Accordingly, the primary object of the present invention is to provide a microprogrammed control system of a computer in which the operation of the branching instruction may be executed within one machine cycle effectively.

Another object of the present invention is to provide a microprogrammed control system of a computer in which the processing speed of the operation is improved and thus an entire computer system is operated effectively.

According to broad aspect of the invention, there is provided a microprogrammed control system comprising a first memory for storing a microprogram having ordinary and branch instructions, the branch instruction including an operation code, a control code and an address, said first memory including an address input port; a second memory for storing instructions, which includes an address input port; an address register for storing an address of an instruction to be next executed, which includes an input port; address updating means for updating the address in the address register to a further next instruction; an instruction register for storing a currently executed instruction, which includes an input port; first means connected to the instruction register for generating a first signal when the instruction in the instruction register is the ordinary instruction and a second signal when the instruction is the branch instruction; second means connected to the first means and responsive to the first signal for transferring the instruction to be next executed which corresponds to the address in the address register from the first memory to the input port of the instruction register and for transferring the update address of the address updating means to the address input port of the address register; and third means connected to the first means and responsive to the second signal for transferring the branch address designated by the branch instruction into the address input port of the address register and for transferring an instruction designated by the control code of the branch instruction in the instruction register from the second memory to the input port of the instruction register, said branch address and said instruction from the second memory being stored in the address register and the instruction register in response to a clock pulse.

According to the present invention, during the execution of the branching microinstruction, a specified microinstruction determined by the operation of the branching microinstruction per se is stored in the memory other than a main memory storing the microprogram therein. The specified microinstruction is loaded into the microinstruction register when the branching microinstruction execution is completed, and is executed in the later machine cycles for the branching microinstruction, i.e., in the instruction read-out cycle of the branch address.

Other objects and features of the present invention will be apparent from the following description taken in connection with the accompanying drawings, in which:

FIG. 3 is a block diagram of a modification of the microprogrammed control system of FIG. 1.

Figure 1:
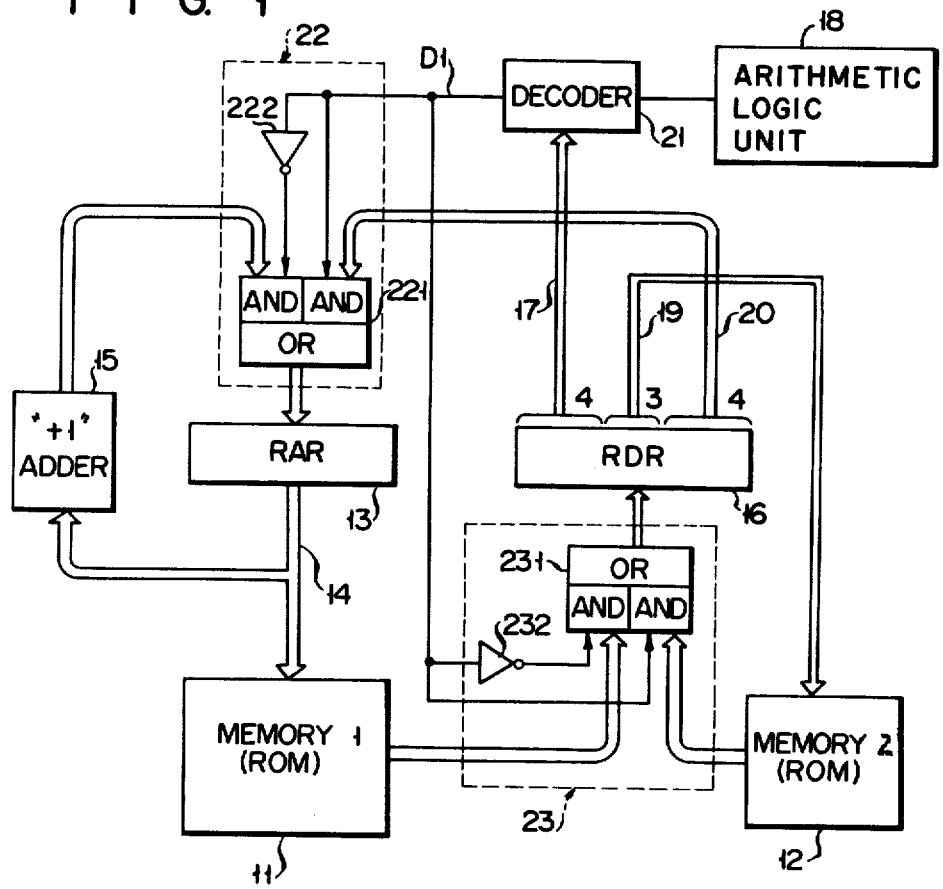
FIG. 1 shows a block diagram of a microprogrammed control system of computers of an embodiment of the present invention.

Reference will now be made to FIG. 1 illustrating in block form a microprogrammed control system according to the present invention. In the figure, reference numeral 11 designates a first memory for storing a microprogram including ordinary and branching instructions or ordinary and branching microinstructions and the memory 11 is a read only memory (ROM) of conventional type having a capacity sufficient for storing a main microprogram, e.g., 2K words. A second memory designated by reference numeral 12 of ROM is essential to the present invention and stores instructions, i.e., microinstructions of 8 words as shown in Table 1. It is desirable that the microinstructions stored in the memory 12 is one most widely and frequently used. In other words, desirable is one (the microinstruction to be executed succeeding to the branching microinstruction) stored in the branching address of the branching microinstruction used in the microprogram sequence.

Table 1

| ADDRESS | | CONTENTS |
|---|---|---|
| 0 | NOP | No operation |
| 1 | ADD | Add instruction |
| 2 | SUB | Subtraction instruction |
| 3 | AND | Logical production instruction |
| 4 | XOR | Exclusive OR instruction |
| 5 | LOAD | Load instruction |

Table 1-continued

| ADDRESS | CONTENTS | |
|---|---|---|
| 6 | STORE | Store instruction |
| 7 | MOVE | Move instruction |

As seen from the table, the 8 words microinstructions have corresponding addresses, and stored in the addresses allocated in the memory 12. More particularly, NOP microinstruction (no operation) is stored in "0" address of the memory 12, ADD microinstruction (add instruction) in "1" address, SUB microinstruction (subtraction instruction) in address "2", AND microinstruction (logical production instruction) in address "3," XOR microinstruction (exclusive OR instruction) in address "4," LOAD micro instruction (instruction for reading data from the memory) in address "5," STORE microinstruction (instruction for writing data into the memory) in address "6," and MOVE micro instruction (for data transfer) in address "7."

A ROM address register RAR 13 is a location register for storing the address of the microinstruction to be next executed. The address information stored in the register RAR 13 designated the memory 11 through an address line 14. Then, a desired microinstruction to be executed is read out of the address selected of the memory 11.

An adder circuit 15 is well known and add "+1" to the address information in the address register 13 fed through the address line 14. A ROM data register RDR 16 is a microinstruction register for storing the microinstruction read out from the memory 11 or 12. The RDR register 16 is constructed of 11 bits, for example, and each block of a predetermined bit length is led to the corresponding circuit to be described later. More precisely, 4 bits of the microinstruction stored in the register 16 of RDR is fed to a decoder 21 which checks whether or not the microinstruction fed from the register RDR 16 is the branching microinstruction via a signal line 17. The decoder 21 may use, for example, a 4-line-to-16-line... decoder type SN 74154 of TEXAS INSTRUMENTS. When the microinstruction stored in the register RDR 16 is a branching microinstruction, the control field (3 bits) for controlling the operation of the branching microinstruction is fed from the register RDR 16 to the memory 12 via the control line 19. The address field (4 bits) is supplied to the address register RAR 13 via a data line 20. The format of the branching microinstruction used in this invention is shown in Table 2. The branching microinstruction is comprised of an operation code field of 4 bits, a control field of 3 bits, and an address field of 4 bits. The operation code "BR" of the branching microinstruction is stored in the operation field (OP), or control code representing the address for selecting the microinstruction in the memory 12 in the control field (CONTROL) and branching address in the address field (ADDRESS), respectively.

Table 2

| 1 | 4 5 | 7 8 | 11 |
|---|---|---|---|
| OP CODE | CONTROL | ADDRESS | |

Branching microinstruction format

An arithmetic logical control unit 18 for executing the microinstruction stored in the register 16 is connected to the decoder 21. The decoder 21 outputs a decode signal D1 when the microinstruction is the branching microinstruction, and outputs a decode signal D2 when it is not the branching microinstruction. The decode signal D1 controls the operation of the branching microinstruction. The decode signal D2 controls the execution of an ordinary microinstruction other than the branching microinstruction in the arithmatic logical control unit 18.

A control circuit 22 is provided with a conventional AND/OR combination circuit 221 and an inverter 222 for inverting the logical level of the control signal D1 and may comprise, for example, a quadruple 2-line-to-1-line data selector type SN 741157 of TEXAS INSTRUMENTS. The selector circuit 22 selects the address output of the adder circuit 15 or the address field information of the register RDR 16, by using the control signal D1. In more particular, when the control signal D1 is "0" level, i.e., when the microinstruction to be executed is not the branching microinstruction but the ordinary microinstruction, the address information from the adder circuit 15 is selected to be fed to the address register 13. In the case of the branching microinstruction, the control signal D1 is logical "1" and the address field information from the register RDR is selected and transferred to the address register RAR 13 through the data line 20.

Like the selection circuit 22, a selection circuit 23 includes an AND/OR combination circuit 231 and an inverter 231. Likewise, the selection circuit 23 selects the microinstruction from the memory 11 or that from the memory 12, depending on the logical level of the control signal D1. That is, when the logical level of the control signal D1 is "0," the microinstruction from the memory 11 is selected. In the case of the logical level "1," the microinstruction from the memory 12 is selected and is directed to the register RDR 16.

Figure 2:
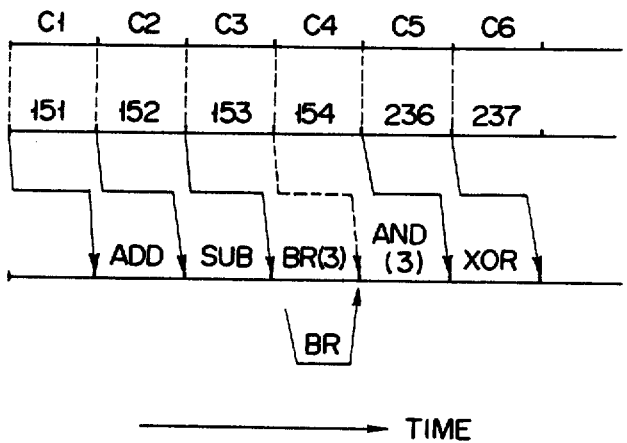
FIG. 2 is a set of timing charts for illustrating the operations of the microprogrammed control system shown in FIG. 2.

The operation of the microprogrammed control system heretofore described will be given referring to FIG. 2 illustrating timing charts. Let us consider now the case where the program shown in Table 3 is executed by the control system of the present invention.

Table 3

| ADDRESS | SYMBOL | CONTENTS |
|---|---|---|
| 151 | START | ADD ........ Add instruction |
| 152 | | SUB ........ Subtraction instruction |
| 153 | | BR3, XYZ .... Conditional branching (236) instruction |
| 154 | | MOVE ........ Move instruction |
| . | | |
| . | | |
| 236 | XYZ | XOR ........ Exclusive OR instruction |
| 237 | | |
| 238 | RETURN | |

In the table, ADDRESS is representative of addresses allocated in the memory 11, SYMBOL indicates flags attached to the data or microinstructions in the program, and CONTENTS indicates the microinstructions stored in the ADDRESS. The respective microinstructions shown in Table 3 are the same as those in Table 2. BR and XYZ indicate the conditional branching microinstructions and when it coincides with the condition 3, it jumps to the flag of XYZ. In this example, the branching microinstruction may be expressed generally by "BR(i)j," where (i) indicates numerals 1 to 8 and the instruction to be executed immediately after the branching microinstruction, i.e., the addresses in the memory 12, and j the branch address to which the branch is made.

Returning again to FIG. 2, it will be seen that the timing charts are suitable for execution of the program shown in Table 3. In FIG. 2(a), machine cycles are labeled as C1, C2, C3..., respectively. In the operation of cycle C2, the microinstruction ADD (corresponding to the contents in the address "151" of the memory 11 shown in table (3) read out in the cycle C1 is stored in the register RDR 16, as shown in FIG. 2(d). And the succeeding address "152" is stored in the address register 13. The ADD microinstruction is fed to the decoder 21 through the signal line 17. Since the ADD microinstruction is not the branch microinstruction, the control signal D1 becomes "0" and the control signal D2 "1," and thus the ADD microinstruction is executed in the arithmatic logical control unit 18. In cycle C2, the succeeding microinstruction SUB (the contents of "152" of address in Table (3) which is loaded from the memory 11 in accordance with the contents "152" of the address register 13 is set in the register RDR11, as shown in FIG. 2(d), through the selection circuit 23. At the same time, the output of the address register RAR 13 is delivered to the adder circuit 15 through the address line 14 where "+1" is added to the contents "152" of the address register RAR 13 and the result of addition is set in the address register RAR13 through the selection circuit 22, as shown in FIG. 2(b). Then, the program operation is advanced to the cycle C3.

As seen from the foregoing description, when the microinstruction is not the branching microinstruction, the FIG. 1 system executes the read-out operation of the microinstruction to be next executed and simultaneously the microinstruction as well. For this, the execution of the microinstruction stored in the register RDR 16 completes at much the same time as the memory access time completes that the succeeding microinstruction to be executed is read out of the memory 11 selected by the address register 13, as shown in FIG. 2(b). The result is that the microinstructions may be executed continuously.

In the cycle C4 shown in FIG. 2 (a), the address "154" is stored in the address register RAR 13 and the microinstruction BR(3) is stored in the register RDR16.

The microinstruction is the branching instruction "BR(3) 236 or XYZ," as shown in Table 3 and thus this branching microinstruction is the conditional branch of which the branching address is "236." The meaning of this conditional branch and its results are not essential to the present invention so that explanation of them will be omitted. In the cycle C4, the microinstruction BR(3) stored in the register RDR16 is transferred into the arithmetic logical control unit 18 where it is decoded and calculated. As a result of the calculation, if the branch condition holds, the control signal D1 is "1." Upon receipt of the control signal D1 of "1," the selection circuit 22 selects the address field information "236" (4 bits address in Table (2) of the branching microinstruction stored in the register RDR 16, through the data line 20. Therefore, the address field information is stored in the address register RAR 13. The control bits (3 bits) of the branching microinstruction "BR(3)" stored in the register RDR 16 designated the address "3" of the memory 12 as shown in Table 1, through the control line 19, and reads out of the memory 12 the microinstruction word "AND" stored in the address "3," as shown in FIG. 2(e). While the microinstruction in the address "154" designated by the address register RAR 13 is read out of the memory, the selection circuit 23 selects the microinstruction "AND" outputted from the memory 12 because of "1" of the control signal D1. Therefore, the microinstruction "AND" is stored in the register RDR 16, as shown in FIG. 2(d). Then, the program operation enters the cycle C4.

In the cycle C5, the microinstruction is the "ADD" microinstruction and not the branching microinstruction so that the decoder 21 of the ALU 18 outputs the control signal D1 of logical level "0." Accordingly, in this cycle, the microinstruction "AND" stored in the register RDR16 is executed and at the same time the microinstruction "XOR" which is the branching (jumping) address "236" shown in Table 3 is read out of the memory 11 in accordance with the contents of the address register RAR 13 and then is loaded into the register RDR 16. Then, the operation shifts to the cycle C6.

In the cycle C6, the microinstruction "XOR" (FIG. 2(d)) read out in the cycle C5 and stored in the register RDR 16 is executed, and at the same time the address "237" with "+1" is stored in the address register RAR 13, as shown in FIG. 2(a). The similar operation will be repeated in the succeeding operation.

In the cycle C5 following the cycle C4 in which the branching microinstruction is executed, the microinstruction in the memory 12 which is directly designated by the branching microinstruction is executed. This means that the ALU 18 always processes any of microinstructions without idle time, resulting in improvement of the operation processing speed.

In the cycle C4, if the branching condition does not hold, the control signal D1 still remains "0." Accordingly, the output "155" of the adder circuit 15 is loaded in the address register RAR 13 and the microinstruction MOVE (see Table 3) read out of the memory 11 is loaded into the register RDR 16. In this case, even if the program operation enters the cycle C5, no branching operation is performed.

If the branching microinstruction in Table 3 is depicted "BR(0)236," the instruction after execution of the branching microinstruction is NOP instruction. For this, in this operation cycle after the branching microinstruction is executed, the fetch operation of the instruction in the branching address alone is executed, substantially in the conventional system.

According to the present invention, pipelining operation for improvement of the operation processing speed is effective in the case of branching microinstruction, resulting in a remarkable increase of the operation processing speed. Particularly, if the present invention is applied to the branching microinstruction in the fetch routine of the microinstruction of the computer of the microprogrammed control system, the operation speed in the fetch cycle of the macroinstruction may also be increased. In this case, the execution time of the macroinstruction in the fetch cycle directly depends on the execution speed of each macroinstruction, thereby increasing the execution speed of the computer.

It is to be noted that, as in the present invention, if a group of microinstructions to be executed after the branching microinstruction is stored in the ROM and these are used at the branching microinstruction, the preparing work of the program may be considerably simplified.

As will be recalled, in the above-mentioned embodiment, the branching address (jumping address) of the branching microinstruction is included in the branching microinstruction per se (one word instruction). A modification is possible in which the branching address may be stored in the address allocated next to that of the branching microinstruction (two words instruction). In this case, the data line 20 shown in FIG. 1 is connected from the memory 11 to the selection circuit 22, as shown in FIG. 3. With this connection, in the cycle C4 of the timing charts in FIG. 2, the contents of "154" address in the memory 11 (branching address) is read out so that, when the branching condition holds, the contents "236" may be supplied to the address register RAR 13. Further in this case, to prevent the idle time occurrence in the cycle C5, the decoder 21 produces a control signal D3 giving the logical level "1" irrespective of validation of the branching condition, if the microinstruction fed from the register RDR 16 is the branching micro instruction. The control signal D3 is then transferred to the selection circuit 23. Therefore, in the FIG. 3 system, even when the branching microinstruction of two words instruction type is issued, the microinstruction is executed independently from the validation of the branching condition, the microinstruction being read out of the memory 12 selected by the branching microinstruction immediately after the branching microinstruction.

It should be understood that the present invention may be modified so that individual microinstructions for the validation and invalidation of the branching condition are selectively executed.

What is claimed is:

1. A microprogrammed control system comprising:
   a first memory for storing a microprogram having ordinary and branch instructions, the branch instruction including an operation code, a control code and an address, said first memory including an address input port;
   a second memory for storing instructions, which includes an address input port;
   an address register for storing an address of an instruction to be next executed, which includes an input port;
   address updating means for updating the address in the address register to a further next instruction;
   an instruction register for storing a currently executed instruction, which includes an input port;
   first means connected to the instruction register for generating a first signal when the instruction in the instruction register is the ordinary instruction and a second signal when the instruction is the branch instruction;
   second means connected to the first means and responsive to the first signal for transferring the instruction to be next executed which corresponds to the address in the address register from the first memory to the input port of the instruction register and for transferring the update address of the address updating means to the address input port of the address register; and
   third means connected to the first means and responsive to the second signal for transferring the branch address designated by the branch instruction into the address input port of the address register and for transferring an instruction designated by the control code of the branch instruction in the instruction register from the second memory to the input port of the instruction register, said branch address and said instruction from the second memory being stored in the address register and the instruction register in response to a clock pulse.

2. A microprogrammed control system according to claim 1 wherein the first means comprises a decoder connected to the instruction register for generating the first signal in response to the ordinary instruction in the instruction register or the second signal in response to the branch instruction.

3. A microprogrammed control system according to claim 1 wherein the second means comprises a first gate circuit connected between the first memory and the instruction register for transferring the instruction from the first memory to the input port of the instruction register in response to the first signal from the first means, and a second gate circuit connected between the address updating means and the address register for transferring an update address from the address updating means into the input port of the address register; and the third means comprises a third gate circuit connected between the second memory and the instruction register for transferring an instruction from the second memory into the instruction register in response to the second signal from the first means and a fourth gate circuit connected between the instruction register and the address register for transferring the branch address of the branch instruction in the instruction register to the input port of the address register in response to the second signal from the first means.

4. A microprogrammed control system according to claim 1 wherein the address updating means comprises an adder for adding an integer to the address transferred from the address register to produce an update address.

5. A microprogrammed control system according to claim 1 wherein the second means comprises a first gate circuit connected between the first memory and the instruction register for leading the instruction from the first memory to the input port of the instruction register in response to the first signal from the first means, and a second gate circuit connected between the address updating means and the address register for leading an update address from the address updating means into the input port of the address register; and the third means comprises a third gate circuit connected between the second memory and the instruction register for leading an instruction from the second memory into the input port of the instruction register in response to the second signal from the first means and a fourth gate circuit connected between the instruction register and the address register for leading the address designated by the branch instruction in the instruction register from the instruction register to the input port of the address register in response to the second signal from the first means.

6. A microprogrammed control system according to claim 5 wherein the address updating means comprises an adder for adding an integer to the address transferred from the address register therein to produce an update address.

* * * * *